(12) United States Patent
Patel et al.

(10) Patent No.: US 8,957,127 B2
(45) Date of Patent: Feb. 17, 2015

(54) LIQUID GLUE FORMULATED WITH ACRYLIC EMULSIONS

(71) Applicant: Elmer's Products, Inc., Westerville, OH (US)

(72) Inventors: Yogeshbhai B. Patel, Reynoldsburg, OH (US); Van R. Foster, Westerville, OH (US)

(73) Assignee: Elmer's Products, Inc., Westerville, OH (US)

( * ) Notice: Subject to any disclaimer, the term of this patent is extended or adjusted under 35 U.S.C. 154(b) by 0 days.

(21) Appl. No.: 13/653,764

(22) Filed: Oct. 17, 2012

(65) Prior Publication Data

US 2013/0102700 A1    Apr. 25, 2013

Related U.S. Application Data

(60) Provisional application No. 61/550,022, filed on Oct. 21, 2011.

(51) Int. Cl.
| | | |
|---|---|---|
| C09D 133/08 | (2006.01) |
| C08L 25/14 | (2006.01) |
| C08K 5/053 | (2006.01) |
| C08K 5/17 | (2006.01) |
| C09J 133/00 | (2006.01) |
| C09J 133/02 | (2006.01) |
| C09J 133/08 | (2006.01) |

(52) U.S. Cl.
CPC ............. C09D 133/08 (2013.01); C09J 133/08 (2013.01); C08K 5/053 (2013.01); C08K 5/17 (2013.01)
USPC ............ 523/122; 524/186; 524/388; 524/515

(58) Field of Classification Search
None
See application file for complete search history.

(56) References Cited

U.S. PATENT DOCUMENTS

| 4,764,632 | A * | 8/1988 | Cohen ............................. 556/27 |
| 4,898,787 | A * | 2/1990 | Min et al. ...................... 428/480 |
| 5,462,768 | A * | 10/1995 | Adkins et al. ................. 427/265 |
| 5,561,941 | A * | 10/1996 | Long .............................. 43/121 |
| 5,668,197 | A * | 9/1997 | Schilling ......................... 524/61 |
| 6,881,247 | B2 * | 4/2005 | Batdorf ..................... 106/15.05 |
| 2004/0109853 | A1 * | 6/2004 | McDaniel .................... 424/94.6 |
| 2004/0175407 | A1 * | 9/2004 | McDaniel ..................... 424/423 |
| 2009/0238811 | A1 * | 9/2009 | McDaniel et al. ........... 424/94.2 |
| 2010/0210745 | A1 * | 8/2010 | McDaniel et al. ............. 521/55 |
| 2010/0233146 | A1 * | 9/2010 | McDaniel ................... 424/94.2 |
| 2010/0248334 | A1 * | 9/2010 | McDaniel ................... 435/262.5 |
| 2011/0240064 | A1 * | 10/2011 | Wales et al. ..................... 134/26 |
| 2011/0250626 | A1 * | 10/2011 | Williams et al. ................ 435/18 |
| 2012/0097194 | A1 * | 4/2012 | McDaniel et al. .............. 134/26 |

FOREIGN PATENT DOCUMENTS

JP    55023175 A * 2/1980 ............... C09K 3/10

* cited by examiner

*Primary Examiner* — James J Seidleck
*Assistant Examiner* — Peter A Salamon
(74) *Attorney, Agent, or Firm* — McNees, Wallace & Nurick, LLC

(57) ABSTRACT

A liquid adhesive formulation, that includes a blend of at least one all-acrylic emulsion polymer and at least one styrene acrylic copolymer emulsion; as well as at least one organic amine; at least one freeze-thaw stabilizer; at least one, bactericide; at least one mildewcide; at least one surfactant; at least one coalescent; at least one adhesion promoter; at least one solvent; at least one rheology modifier; at least one defoamer; or combinations thereof.

18 Claims, No Drawings

LIQUID GLUE FORMULATED WITH ACRYLIC EMULSIONS

CROSS-REFERENCE TO RELATED APPLICATIONS

This patent application claims the benefit of U.S. Provisional Patent Application Ser. No. 61/550,022 filed on Oct. 21, 2011 and entitled "Liquid Glue Formulated with Acrylic Dispersions," the disclosure of which is hereby incorporated by reference herein in its entirety and made part of the present U.S. utility patent application for all purposes.

BACKGROUND OF THE INVENTION

The present invention relates generally to liquid glue and adhesive formulations and more specifically to a liquid glue formulation that includes a blend of waterborne acrylic polymers that offers superior adhesion and other performance benefits over commercially available waterborne technologies and traditional reactive technologies.

Polyvinyl acetate (PVAc) emulsion technology is a commonly used technology for formulating non-toxic, liquid waterborne white glues for the stationery market. Such glues are used by adults and children because of their non-toxicity and performance when adhering paper and other craft materials such as, for example, wood, pasta noodles and fabric. Although such formulations are also widely used in the wood working industry as wood adhesives for adhering wood items firmly together, such technologies are typically not effective with materials such as plastics and metals. Traditional reactive technologies such as polyurethane epoxy and cyanoacrylate will securely adhere such substrates to one another, but these technologies do not afford clean-up with water and are not classified as being non-toxic. Consequently, adhesives of this nature would likely be limited to adults use because they are not considered safe for children. Accordingly, there is a need for a waterborne glue formulation that is effective for use with non-wood surfaces and that provides desired non-toxicity and water clean-up properties.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first liquid adhesive formulation is provided. This formulation includes a blend of acrylic emulsions. The blend of acrylic emulsions further includes an all-acrylic emulsion polymer as well as a styrene acrylic copolymer emulsion.

In accordance with another aspect of the present invention, a second liquid adhesive formulation is provided. This formulations includes a first component, where in the first component further includes at least one all-acrylic emulsion polymer and at least one styrene acrylic copolymer emulsion; and a second component, wherein the second component further includes at least one organic amine; at least one freeze-thaw stabilizer; at least one, bactericide; at least one mildewcide; at least one surfactant; at least one coalescent; at least one adhesion promoter; at least one solvent; at least one rheology modifier; at least one defoamer; or combinations thereof.

In yet another aspect of this invention, a third liquid adhesive formulation is provided. This formulation includes a first component, where in the first component further includes at least one all-acrylic emulsion polymer and at least one styrene acrylic copolymer emulsion; and a second component, wherein the second component further includes at least one organic amine; at least one freeze-thaw stabilizer; at least one, bactericide; at least one mildewcide; at least one surfactant; at least one coalescent; at least one adhesion promoter; at least one solvent; at least one rheology modifier; at least one defoamer; at least one colorant; or combinations thereof.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the following descriptions are to be regarded as illustrative and not restrictive in nature.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously stated, the present invention provides a liquid glue formulation that includes a blend of waterborne acrylic polymers that confers superior adhesion and other performance benefits over commercially available waterborne technologies and traditional reactive technologies. Exemplary embodiments of this invention include a specific combination of waterborne acrylic polymers that combine non-toxicity and water clean-up properties with the ability to adhere non-wood surfaces together. While limited adhesive strength is obtained using a traditional PVAc liquid adhesive, much better adhesion is obtained for the acrylic-based adhesives of the present invention. In one or more exemplary embodiments, the present invention includes a first acrylic emulsion, which may be an all-acrylic emulsion polymer and a second acrylic emulsion, which may be a styrene-acrylic emulsion. Various exemplary formulations may also include at least one organic amine, at least one freeze-thaw stabilizer, at least one, bactericide, at least one mildewcide, at least one surfactant, at least one coalescent, at least one adhesion promoter, at least one solvent, at least one rheology modifier, and at least one defoamer. Other exemplary formulations of this invention include one or more colorants. Not every formulation of this invention will include all of these ingredients and additional or alternate ingredients may be included in certain formulations of the present invention.

Having generally described this invention, a further understanding can be obtained by reference to certain specific examples detailed below, which are provided for purposes of illustration only and are not intended to be all inclusive or limiting unless otherwise specified.

EXAMPLE I

Adhesive Formulation YP4-88

|  | Description | % (by wt) |
|---|---|---|
| Rhoplex AC-261LF | acrylic emulsion | 77.00 |
| Carboset SA-820 | styrene-acrylic emulsion | 10.00 |

|  | Description | % (by wt) |
|---|---|---|
| AMP-95 | organic amine | 0.30 |
| Propylene Glycol | freeze-thaw stabilizer | 1.75 |
| Acticide LA | bactericide | 0.10 |
| Acticide 45 | mildewcide | 0.10 |
| Envirogem AD01 | surfactant | 0.05 |
| Texanol | coalescent | 1.00 |
| Coatosil-1770 | adhesion promoter | 0.10 |
| Water | solvent | 8.15 |
| Acrysol ASE60 | rheology modifier | 1.35 |
| Rhodoline 581B | defoamer | 0.10 |
|  |  | 100.00 |

An exemplary mixing procedure for the adhesive formulation disclosed in Example I includes the steps of: (i) in a clean and dry mixing tank under moderate agitation add Rhoplex AC-261LF (Dow), which is an all-acrylic emulsion polymer, and Carboset SA-820 (Lubrizol), which is a styrene acrylic copolymer emulsion, and mix until uniform; (ii) add AMP-95 (Dow), propylene glycol, Acticide LA (Thor), Acticide 45 (Thor) and Envirogem AD01 (Air Products) and mix until uniform; (iii) add Texanol (Eastman) and Coatosil-1770 (Momentive) and mix until uniform; (iv) in a separate container, mix water and Acrysol ASE60 (Dow); (v) increase the mixing speed of the adhesive batch and add the Acrysol mixture slowly into the vortex (add in small increments to avoid lumping); and (vi) add Rhodoline 581B (Rhodia) and continue mixing at moderate speed until uniform to avoid aeration.

EXAMPLE II

Adhesive Formulation YP4-110

|  | Description | % (by wt) |
|---|---|---|
| Rhoplex AC-261LF | acrylic emulsion | 77.00 |
| Carboset SA-820 | styrene-acrylic emulsion | 10.00 |
| AMP-95 | organic amine | 0.30 |
| Propylene Glycol | freeze-thaw stabilizer | 1.75 |
| Acticide LA | bactericide | 0.10 |
| Acticide 45 | mildewcide | 0.10 |
| Envirogem AD01 | surfactant | 0.05 |
| Texanol | coalescent | 1.00 |
| Coatosil-1770 | adhesion promoter | 0.10 |
| Water | solvent | 8.145 |
| Tint-Ayd CW-5317 | colorant | 0.005 |
| Acrysol ASE60 | rheology modifier | 1.35 |
| Rhodoline 581B | defoamer | 0.10 |
|  |  | 100.00 |

An exemplary mixing procedure for the adhesive formulation disclosed in Example II includes the steps of: (i) in a clean and dry mixing tank under moderate agitation add Rhoplex AC-261LF and Carboset SA-820 and mix until uniform; (ii) add AMP-95, propylene glycol, Acticide LA, Acticide 45 and Envirogem AD01 and mix until uniform; (iii) add Texanol and Coatosil-1770 and mix until uniform; (iv) in a separate container mix water, Tint-Ayd CW-5317 (GMZ) and Acrysol ASE60; (v) increase the mixing speed of the adhesive batch and add the Acrysol mixture slowly into the vortex (add in small increments to avoid lumping); and (vi) add Rhodoline 581B and continue mixing at moderate speed until uniform to avoid aeration.

Unlike other acrylic adhesives, the formulas of the present invention are freeze-thaw stable when frozen at 0° C. Another advantage of these formulas when compared to traditional reactive technologies is general ease of application and use. While epoxy adhesives require mixing two components together, the liquid adhesive of this invention is a one-part system. One-part polyurethane liquid glues do not require mixing but during the curing process, carbon dioxide is emitted, which typically causes the product to "foam" as it cures. The acrylic glues of this invention do not "foam" as a final bond is formed. Typical cyanoacrylate technology yields glued bonds that are brittle and can easily be broken if dropped on a hard surface. A fast cure rate can also be a detriment when time is needed to position two surfaces together before obtaining a final bond. The liquid glues of this invention develop a less brittle bond when gluing two surfaces together and allows the end user additional working time to position the two pieces together before forming a final bond. Another advantage of the product is that it is considered to be "acid-free," which makes it more desirable for crafters.

While limited adhesive strength is obtained using a traditional PVAc liquid adhesive, much better adhesion is obtained for the acrylic-based adhesives of the present invention, which typically outperformed other commercially available polyurethane adhesives (see Table 1, below, wherein an exemplary adhesive formula of the present invention is designated Acrylic Glue YP4-88).

TABLE 1

Performance Comparison (7-day cure time)

|  | Acrylic Glue YP4-88 | PVAc Glue (EGA) | Polyurethane Glue-1 | Polyurethane Glue-2 |
|---|---|---|---|---|
| Physical Properties: |  |  |  |  |
| Color: Wet/Dry | White/Clear | White/Translucent | Brown/Yellow | Amber/Light Yellow |
| Viscosity, Cps | 4500 | 5000 | 10,000 | 7,500 |
| pH | 9.3 | 4.9 | N/A | N/A |
| Solids % | 47.4 | 41 | 100 | 100 |
| Freeze/Thaw | Pass 3 cycles | Pass 3 cycles | N/A | N/A |
| Foam Expansion | None | None | 212% | 25% |
| Water Clean Up? | Yes | Yes | No | No |
| ACMI Rating | AP Non-Toxic | AP Non-Toxic | None Listed | CL |
| ANSI Classification | ANSI Type II | None | None Listed | ANSI Type I |

TABLE 1-continued

Performance Comparison (7-day cure time)

|  | Acrylic Glue YP4-88 | PVAc Glue (EGA) | Polyurethane Glue-1 | Polyurethane Glue-2 |
|---|---|---|---|---|
| Performance Properties: | | | | |
| Compressive Strength PSI - on maple wood* | 1454 | 2600 | 1919 | 2312 |
| Lap Shear Strength: PSI* | | | | |
| Steel to Steel | 350 | 699 | 996 | 1163 |
| Steel to Wood | 785 | 645 | 577 | 840 |
| Stainless Steel to Stainless Steel | 55 | 21 | 481 | 728 |
| Stainless Steel to Wood | 655 | 70 | 384 | 561 |
| Aluminum to Aluminum | 345 | 270 | 542 | 736 |
| Aluminum to Wood | 720 | 415 | 667 | 780 |
| PVC to PVC | 122 | 41 | 264 | 344 |
| PVC to Wood | 305 | 110 | 372 | 364 |
| Acrylic to Acrylic | 255 | 2 | 145 | 277 |
| Acrylic to Wood | 660 | 8 | 426 | 673 |
| ABS to ABS | 255 | 53 | 134 | 262 |
| ABS to Wood | 545 | 23 | 424 | 546 |

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A liquid adhesive formulation, comprising:
   (a) a blend of acrylic emulsions, wherein the blend of acrylic emulsions further includes an all-acrylic emulsion polymer and a styrene acrylic copolymer emulsion, and wherein the ratio of the all-acrylic emulsion polymer to the styrene acrylic copolymer emulsion is 7.7:1; and
   (b) at least one adhesion promoter.

2. The formulation of claim 1, wherein the formulation further includes at least one organic amine.

3. The formulation of claim 1, wherein the formulation further includes at least one freeze-thaw stabilizer.

4. The formulation of claim 3, wherein the at least one freeze-thaw stabilizer is propylene glycol.

5. The formulation of claim 1, wherein the formulation further includes at least one, bactericide.

6. The formulation of claim 1, wherein the formulation further includes at least one mildewcide.

7. The formulation of claim 1, wherein the formulation further includes at least one surfactant.

8. The formulation of claim 1, wherein the formulation further includes at least one coalescent.

9. The formulation of claim 1, wherein the formulation further includes at least one solvent, and wherein the solvent is water.

10. The formulation of claim 1, wherein the formulation further includes at least one rheology modifier.

11. The formulation of claim 1, wherein the formulation further includes at least one defoamer.

12. The formulation of claim 1, wherein the formulation further includes at least one colorant.

13. A liquid adhesive formulation, consisting of:
   (a) a first component, where in the first component further includes at least one all-acrylic emulsion polymer; and at least one styrene acrylic copolymer emulsion;
   (b) a second component, wherein the second component further includes at least one organic amine; at least one freeze-thaw stabilizer; at least one bactericide; at least one mildewcide; at least one surfactant; at least one coalescent; at least one solvent; at least one rheology modifier; at least one defoamer; and
   (c) at least one adhesion promoter.

14. The formulation of claim 13, wherein the at least one freeze-thaw stabilizer further includes propylene glycol.

15. The formulation of claim 13, wherein the at least one solvent further includes water.

16. A liquid adhesive formulation, consisting of:
   (a) a first component, where in the first component further includes at least one all-acrylic emulsion polymer; and at least one styrene acrylic copolymer emulsion;
   (b) a second component, wherein the second component further includes at least one organic amine; at least one freeze-thaw stabilizer; at least one bactericide; at least one mildewcide; at least one surfactant; at least one coalescent; at least one solvent; at least one rheology modifier; at least one defoamer; at least one colorant, and
   (c) at least one adhesion promoter.

17. The formulation of claim 16, wherein the at least one freeze-thaw stabilizer further includes propylene glycol.

18. The formulation of claim 16, wherein the at least one solvent further includes water.

* * * * *